Figure 1:
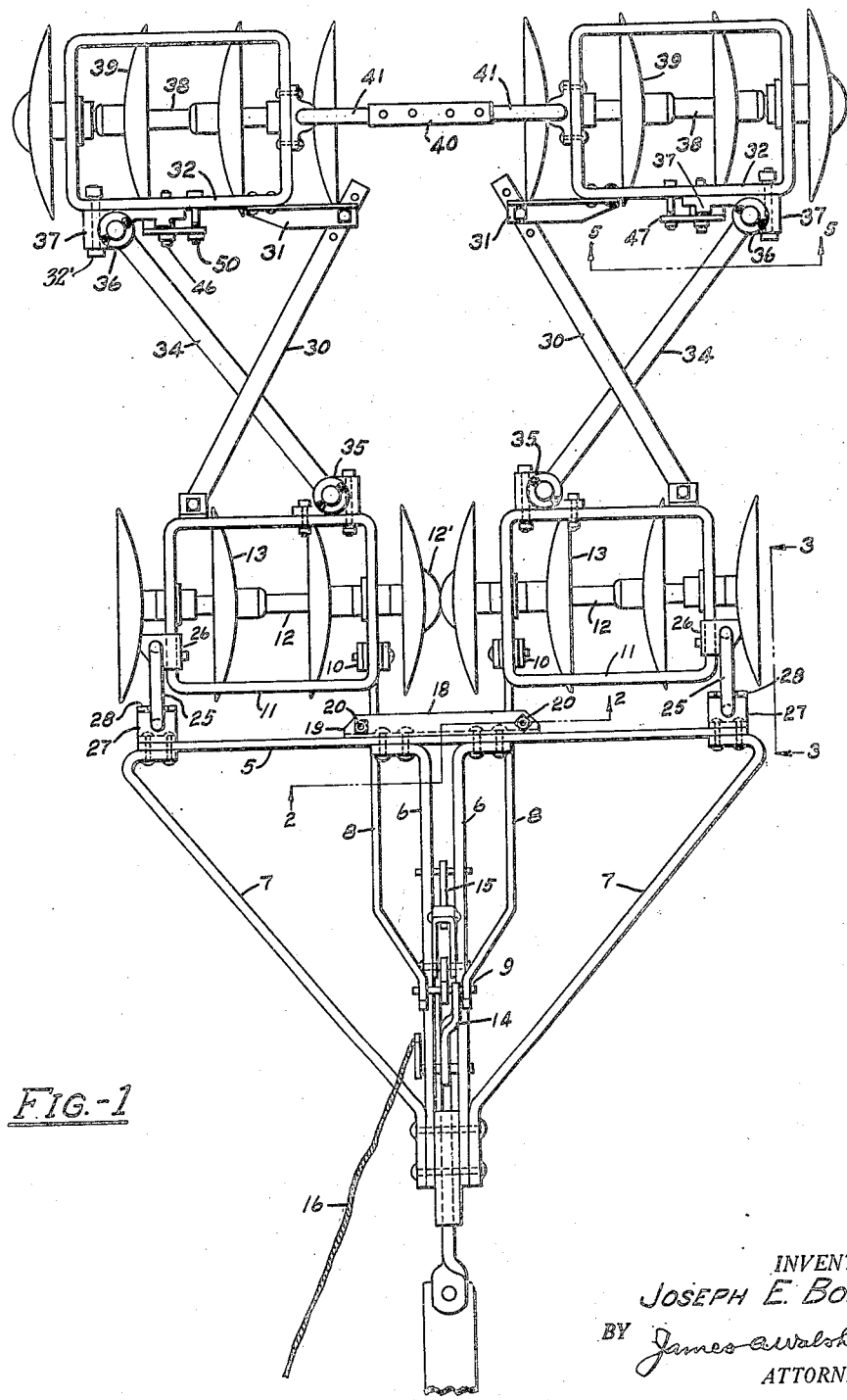

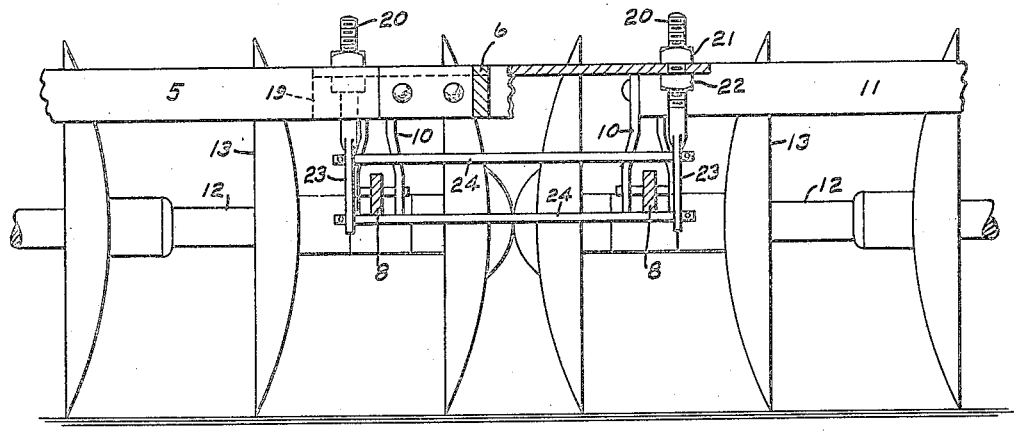
Fig.-2
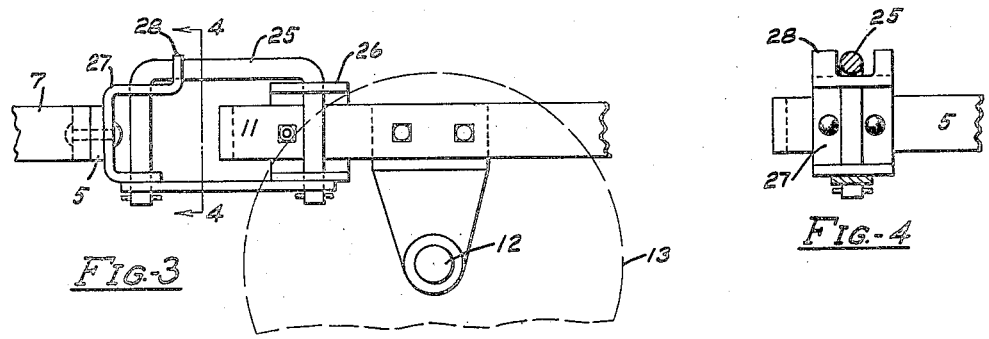
Fig.-3   Fig.-4
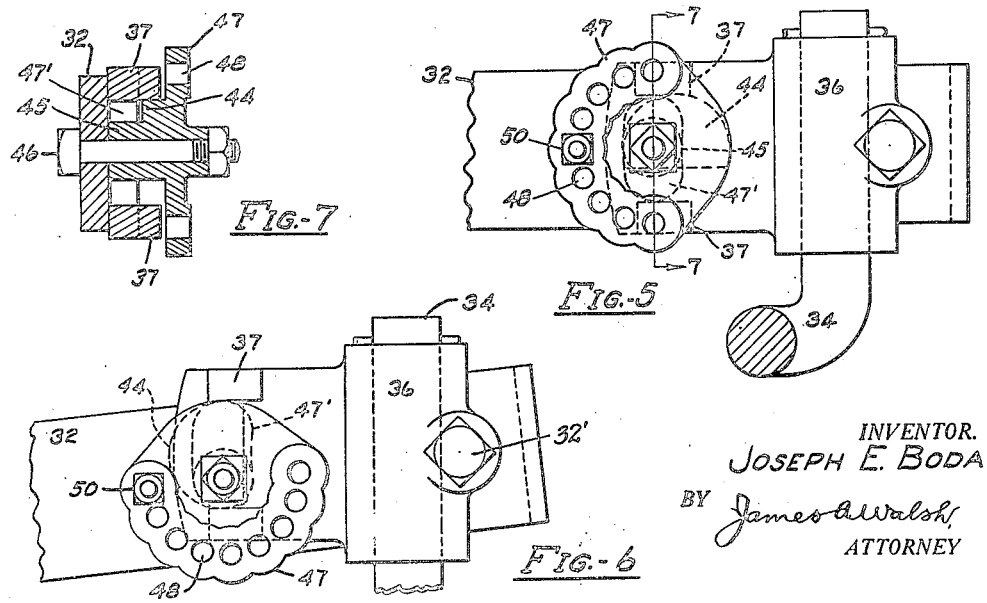
Fig.-7   Fig.-5
Fig.-6
INVENTOR.
JOSEPH E. BODA
BY James A Walsh
ATTORNEY Patented July 24, 1934

1,967,493

UNITED STATES PATENT OFFICE 1,967,493

DISK HARROW

Joseph E. Boda, Rockford, Ill., assignor to J. I. Case Company, Racine, Wis., a corporation Application December 1, 1932, Serial No. 645,212

8 Claims. (Cl. 55—83)

The object of my invention is to improve generally the construction and operation of disk harrows whereby the front and rear gangs may be so adjusted that the disks thereof will penetrate the earth at uniform depth throughout the dimensions of the gangs, to also maintain the front gangs in alignment and prevented from spreading when in transport position and to permit angular positioning thereof when in field operations, as well as to provide a vertically controlled drawbar pivotally connected to the forward gangs in advance of the axles thereof, and other advantages will be apparent, as will hereinafter appear.

In the accompanying drawings, forming part hereof, Figure 1 is a plan view of a disk harrow embodying my improvements; Fig. 2, a detail front elevation taken on the dotted line 2—2 in Fig. 1; Fig. 3, a detail on the dotted line 3—3 in Fig. 1; Fig. 4, a detail on the dotted line 4—4 in Fig. 3; Fig. 5, a detail on dotted line 5—5 in Fig. 1; Fig. 6, a detail view of the rear gang adjusting device; and Fig. 7 is a detail taken on the dotted line 7—7 in Fig. 5.

In said drawings the numeral 5 indicates the front frame member, to which forwardly extending draft members 6 and 7 are secured, the latter at their outer ends being connected to the members 6, said elements 5, 6 and 7 constituting the main frame. Drawbar members 8 are pivotally connected, at 9, to the draft members 6 and extend rearwardly and each is pivotally but loosely connected to hangers 10 mounted on each of the front gang frames 11 in advance of the axles 12 thereof. The drawbar members 8 have a link 14, latch 15 and other devices associated therewith which are controlled by a trip-rope 16 for adjusting the drawbar, but as these features are of a well known character they will be referred to herein but incidentally.

Upon frame 5 I connect a drawbar snubber 18 which preferably comprises an angle-plate 19, Fig. 2, secured to the frame with the draft members 6, and in which plate is mounted screw followers 20 adjustably held by nuts 21, 22, which followers terminate in depending members 23 for supporting transverse guards 24, between which guards the drawbar members 8 are positioned and which are permitted slight lateral play in relation to the members 23.

The front gangs comprising the frames 11 supporting the axles 12 having bumpers 12' at their inner ends, and disks 13, are connected to the frame 5 by links 25 pivotally mounted in brackets 26 on the gang frame and to brackets 27 on said main frame, the latter brackets including or provided with stops 28 for preventing the front gangs from unduly spreading when the harrow is in transport position, as shown in Fig. 1.

To the outer corners of the front gang frames brace-rods 30 are secured, which extend and are adjustably connected to arms 31 at the inner ends of the rear gang frames 32, and to the inner corners of said front gang frames links 34 are connected by sockets 35 and cross the rods 30, and are connected to sockets 36 forming part of brackets 37 adjacent the outer ends of the rear gang frames 32, which frames are pivotally connected to the brackets 37, as by bolts 32', and support axles 38 having disks 39 thereon, and which frames are connected by an arch coupling embodying a sleeve 40 to which the coupling members 41 are adjustably connected. In practice it will be understood that land conditions with which the operator is familiar require predetermined adjustments of the gangs to obtain uniformity of harrowing throughout the dimensions of the gangs when in tilling position, and especially so as the outer disks tend to dig deeper into the earth than the inner disks, and this adjustment is readily accomplished by means of a cam 44 embodying a hub 45 secured to the frame 32 by a bolt 46, said cam embodying a controller 47 having a series of holes 48 therethrough adapted to be engaged by a bolt 50 in the frame. When it is desired to change the angle of the frame 32, as for example as indicated in Fig. 6, the bolt 50 is withdrawn sufficiently to permit turning of the controller 47, which causes the cam portion 44 engaging the bracket 37 to throw the frame, which is pivotally connected at 32' with the bracket, into the angle shown or otherwise, and when such angularity is determined the parts are fixedly secured by replacing and tightening the bolt 50, it being understood that the recessed portion 47' between the hub 45 and bracket 37, Fig. 7, permits the vertical movement of the frame 32 according to the direction in which the controller 47 is adjusted.

For the reasons explained requiring adjustment of the rear gangs so that the inner ends thereof will be adjusted to counteract the resistance of the outer disks which are inclined to dig, and to thus obtain uniform treatment of the earth, it is also necessary to control the front gangs, the inner disks of which tend to dig. As indicated, the position of the front and rear gangs for transportation is shown in Fig. 1, the stops 28 preventing spreading of the front gangs while the bumpers 12' limit their inward movement, so that the said front and rear gangs are maintained in alignment for the purpose. For operative purposes, the rear gangs having been adjusted as required, the front gangs are then adjusted by means of the snubber frame 24, which may be raised and lowered by the followers 20, whereby the drawbar members 8 may be elevated, which action lifts the inner ends of the forward gangs to the height desired to produce uniform action of the disks upon the earth throughout the dimensions of the gangs, it being understood of course that the snubber may be manipulated by the followers 20 to bring the drawbar members and consequently the inner ends of the disks to predetermined position and so maintain the parts. When the gangs have been adjusted as desired the harrow is ready to operate, and by pulling the trip-rope 16 the forward ends of the drawbars 8 are released in a well known manner, so that resistance of the front disks causes the gang frames 11 to pull the drawbar members rearwardly and throw the inner ends of said gangs rearwardly or in inclined relation to the frame 5, which swinging is accomplished through the medium of the links 25 pivotally mounted in the brackets 26 and the lateral play of the drawbar members in relation to the followers 23 and their loose connection with the hangers 10 by which a requisite but limited angularity of the gangs is effected. As the front gangs are thus assuming angular position the braces 30 and links 34 throw the rear gangs at an opposite angle, that is their inner ends are moved forwardly toward the inner ends of the forward gangs while their outer ends are swung rearwardly and away from the outer ends of the forward gangs, in which positions all of the gangs are in tillage condition. I am thus enabled to provide a disk harrow of a highly flexible character capable of a variety of adjustments both laterally and vertically and the pivoted parts of which are self-adjustable and require no levers or other manually controlled devices for manipulation.

I claim as my invention:

1. In a harrow, a main frame having pivot bearings thereon, a pair of gangs each including a frame having a disk supporting axle, pivot bearings on the gang frames, means for pivotally connecting the main and gang frame bearings, means associated with the main frame bearings for preventing the gang frames from swinging laterally outward when the harrow is in transport position, means for preventing inward movement of said frames when in the position stated, and means releasably connected to the main frame and pivotally connected to the gang frames whereby the latter may swing on their pivotal connections with the main frame.

2. In a harrow, a main frame having pivot bearings thereon, front gang frames having pivot bearings thereon, links connecting said bearings whereby the gang frames may swing laterally to operative position, and means associated with the main frame pivot bearings for engaging the links when swinging outwardly to limit the outward swinging movement of the gang frames.

3. In a harrow, a main frame having pivot bearings thereon, front gang frames including axles having disks thereon, pivot bearings on said gang frames in advance of the axles, links connecting said main and gang frame bearings whereby the gang frames may swing laterally to operative position, and means associated with the main frame pivot bearings for engaging the links when swinging outwardly to limit the outward swinging movement of the gang frames.

4. In a harrow, a main frame, adjustable front disk gangs including frames pivotally connected to the main frame whereby the gang frame may swing into operative angular relation to the main frame when draft force is applied to the harrow, means connecting the main frame and the gang frames for raising and lowering the inner ends of the gang frames in relation to the main frame to provide uniform penetration of the disks, means releasably connected to the main frame and pivotally connected to said frames for positioning the frames in angular relation to the main frame when the harrow is drawn, rear disk gangs including frames horizontally and vertically adjustably connected to the front gang frames so that each rear gang frame will assume an angled position in relation to the front gang in line therewith and at an opposite angle to the latter when draft force is applied to the harrow, and means associated with the rear gangs for vertically adjusting the inner ends of the latter relatively to the front gangs to provide uniform penetration of the rear gang disks.

5. In a harrow, a main frame, adjustable front disk gang frames pivotally connected to the main frame to be swung into angular relation to the main frame and also to be raised and lowered at their inner ends with respect to the main frame, means connected to the main frame and to the gang frames for vertically adjusting the inner ends of the gang frames in relation to the main frame to provide uniform penetration of the disks and also for swinging said gang frames horizontally with respect to the main frame when draft force is applied to the harrow, rear disk gang frames horizontally and vertically adjustably connected to the front gang frames to be positioned in angular relation to the latter when the harrow is drawn, each of said rear frames including a bracket, and a cam connecting the bracket and the rear gang frame including a controller for operating the cam to engage the bracket and vertically adjust the inner end of the rear frame with respect to the front gang frame in alignment therewith to provide uniform penetration of the rear gang disks.

6. In a harrow, a main frame, a front disk gang frame pivotally connected to the main frame to be swung into angular relation to the latter when draft force is applied to the harrow and also to be vertically adjusted at its inner end with respect to the main frame, means connected to the main frame and to the gang frame for vertically adjusting the inner end of the latter in relation to the main frame to provide uniform penetration of the disks and also whereby said gang frame may swing horizontally with respect to the main frame, a rear gang frame horizontally and vertically adjustably connected to the front gang frame to be positioned in angular relation to the latter when draft force is applied to the harrow, said rear gang having a bracket thereon, a cam connecting the rear frame and bracket and engaging the latter for raising and lowering the inner end of the rear frame, a controller associated with the cam for operating the latter to vertically adjust said rear frame to varying angles in relation to the front gang frame to provide uniform penetration of the rear gang disks, and means for securing the controller in relation to the rear frame to maintain the latter in adjusted position.

7. In a harrow, a main frame, a front gang frame pivotally connected to the main frame to be swung into angular relation to the latter when draft force is applied to the harrow and also to be vertically adjusted at its inner end with respect to the main frame, means connected to the main frame and to the gang frame for vertically adjusting the inner end of the latter in relation to the main frame to provide uniform penetration of the disks and also whereby said gang frame may swing horizontally with respect to the main frame when the harrow is drawn, a rear disk gang frame horizontally and vertically adjustably connected to the front frame to be positioned into angular relation to the latter when the harrow is drawn, a bracket mounted on the rear frame, a cam device associated with the rear frame and bracket and engageable with the latter for vertically adjusting the rear frame to varying angles in relation to the front gang frame to provide uniform penetration of the rear gang disks, and means for securing the device to the rear frame for maintaining the latter in adjusted position.

8. In a harrow, a main frame, draft members connected to the frame, front disk gangs each including a frame pivotally connected to the main frame to be swung into angular relation to the latter, drawbar members pivotally connected to the inner ends of the gangs and releaseably connected to the draft members, means on the main frame and associated with the drawbar members for raising and lowering the latter to vertically adjust the inner ends of the gang frames to provide uniform penetration of the disks thereof, rear disk gangs each including a frame horizontally and vertically adjustably connected to the front gang frames to be positioned into angular relation to the latter, means associated with the rear frames for raising and lowering the inner ends of the latter to varying angles with respect to the front gang frames to provide uniform penetration of the rear gang disks, and means for releasing the drawbar members from the draft members whereby when draft force is applied to the harrow the front gangs will swing on their pivotal connections with the main frame and pull the drawbar members rearwardly to position the front gangs in opposite angular relation to the rear gangs.

JOSEPH E. BODA.